ABSTRACT

United States Patent [19]
Mitsushima et al.

[11] 3,925,327
[45] Dec. 9, 1975

[54] METHOD FOR PRODUCING VINYL ACETATE-ETHYLENE-DICARBOXYLIC ACID DIALLYL ESTER COPOLYMER

[75] Inventors: Hirotsugu Mitsushima; Motohiro Katata, both of Ichihara, Japan

[73] Assignee: Sumitomo Chemical Company, Limited, Osaka, Japan

[22] Filed: Nov. 15, 1972

[21] Appl. No.: 306,582

[30] Foreign Application Priority Data
Nov. 15, 1971 Japan............................. 46-91773

[52] U.S. Cl. ................. 260/78.5 UA; 260/87.3
[51] Int. Cl.²................C08F 2/30; C08F 210/02; C08F 218/08; C08F 218/18

[58] Field of Search...260/78.5 UA, 78.5 HC, 78.5 E, 260/87.3

[56] References Cited
UNITED STATES PATENTS

| | | | |
|---|---|---|---|
| 2,526,773 | 10/1950 | Richards et al.................. | 260/78.5 |
| 3,012,011 | 12/1961 | Martin............................... | 260/78.5 |
| 3,012,013 | 12/1961 | Morikawa et al.................. | 260/78.5 |
| 3,632,542 | 1/1972 | Fox et al......................... | 260/29.6 T |
| 3,692,723 | 9/1972 | Kasagi et al.................... | 260/29.6 E |
| 3,714,099 | 1/1973 | Biale............................ | 260/29.7 TA |

*Primary Examiner*—Joseph L. Schofer
*Assistant Examiner*—John Kight
*Attorney, Agent, or Firm*—Stewart and Kolasch, Ltd.

[57] ABSTRACT

Method for producing a vinyl acetate-ethylene copolymer by emulsion-polymerizing vinyl acetate and ethylene and optionally a polymerizable compound in the presence of an aliphatic dicarboxylic acid diallyl ester of the following formula:

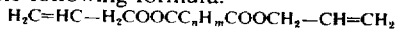

wherein $n$ represents an integer of 2 to 10 and $m$ represents $2n$ or $2n - 2$, and/or an aromatic dicarboxylic acid diallyl ester, said diallyl esters being added in an amount of 2 mole % or less of the total reactants.

7 Claims, 1 Drawing Figure

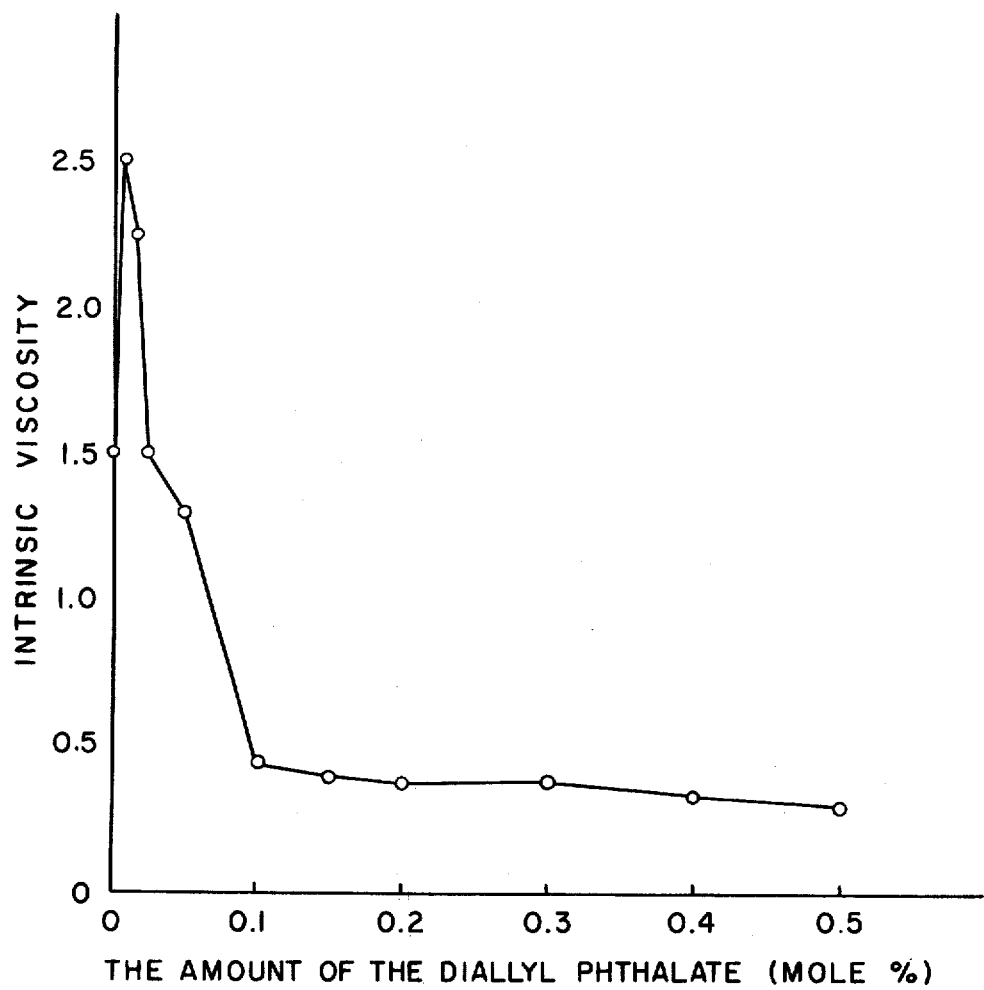

METHOD FOR PRODUCING VINYL ACETATE-ETHYLENE-DICARBOXYLIC ACID DIALLYL ESTER COPOLYMER

The present invention relates to a novel method for producing a vinyl acetate-ethylene copolymer. More particularly, it relates to a novel method for producing an emulsion of vinyl acetate-ethylene copolymer having an optional degree of polymerization by polymerizing vinyl acetate and ethylene in the presence of an aliphatic dicarboxylic acid diallyl ester and/or an aromatic dicarboxylic acid diallyl ester.

As an industrial method for producing an emulsion of vinyl acetate-ethylene copolymer containing 40 % by weight or a lesser amount of ethylene, there hitherto been known a method by emulsion-polymerizing the monomers at a pressure of ethylene of not more than 100 kg/cm² and at a polymerization temperature of 30° to 80°C. However, according to the known method, the produced copolymer has a definite degree of polymerization and its intrinsic viscosity (30°C, in benzene; hereinafter, the same) is within a range of 1.0 to 2.5 dl/g.

There has never been known a method for controlling the molecular weight of the vinyl acetate-ethylene copolymer, but it has rather been possible to control the intrinsic viscosity of the copolymer. However, for producing a copolymer having such a high intrinsic viscosity as 2.5 dl/g, it is necessary to react at a rather low temperature such as 40°C and for a long period of time such as 15 to 20 hours. Further, for raising the ethylene content to 20% by weight or more, it is necessary to increase the pressure of ethylene and to react for a long period. Therefore, even if it is possible to produce a copolymer having 2.0 dl/g or more intrinsic viscosity, there is the disadvantage that it is necessary to react for a long period of time.

On the other hand, for producing a copolymer having a low degree of polymerization, it has been considered to copolymerize at a higher polymerization temperature (so-called, high temperature polymerization) or to use a chain transfer reactant such as mercaptans (so-called chain transfer reaction). However, in the former method, it is necessary to react at a high temperature of 80°C for obtaining a copolymer having an intrinsic viscosity of, for example 0.3 dl/g. At such high temperature, the solubility of ethylene in vinyl acetate is decreased, and a high pressure is required in order to increase the ethylene content. Therefore, the method is extremely disadvantageous for the industrial production of copolymer. Further, according to the latter method by using a chain transfer reactant, a copolymer having a low degree of polymerization can be obtained at a rather lower temperature, but it is necessary to use a large amount of the chain transfer reactant and therefore the chain transfer reactant remains in the produced emulsion which causes an inhibition of its adhesiveness when it is used as an adhesive.

Studies have been conducted to find a method for controlling the degree of polymerization of the copolymer and thereby producing a vinyl acetate-ethylene copolymer which does not have the disadvantages as those of the copolymers produced by the known methods, and it has now been found that an aliphatic dicarboxylic acid diallyl ester and/or an aromatic dicarboxylic acid diallyl ester are specifically effective for the emulsion-polymerization and that the desirable vinyl acetate-ethylene copolymer can be produced by using such diallyl esters.

An object of the present invention is to provide a novel method for producing a vinyl acetate-ethylene copolymer having an optional degree of polymerization.

Other object of the invention is to provide a method for producing an emulsion of vinyl acetate-ethylene copolymer having an optional degree of polymerization.

Another object of the invention is to provide a novel method for producing an emulsion of vinyl acetate-ethylene copolymer having an intrinsic viscosity of about 0.2 to about 3.0.

Further object of the invention is to provide a method for controlling the average degree of polymerization of the produced copolymer.

These and other objects of the invention will be apparent from the description hereinafter.

According to the present invention, the average degree of polymerization of copolymer can be freely controlled by emulsion-polymerizing vinyl acetate and ethylene and optionally another copolymerizable compound in the presence of an aliphatic dicarboxylic acid diallyl ester and/or an aromatic dicarboxylic acid diallyl ester, and thereby there can be produced a vinyl acetate-ethylene copolymer having an optional degree of polymerization.

The aliphatic dicarboxylic acid diallyl esters used in the present invention have the following formula:

wherein n represents an integer of 2 to 10 and m represents $2n$ or $2n - 2$.

In case $m$ is $2n$, i.e. as a saturated aliphatic dicarboxylic acid diallyl ester, there may be, for example diallyl ethane-1,2-dicarboxylate, diallyl propane-1,3-dicarboxylate, diallyl butane-1,4-dicarboxylate, diallyl pentane-1,5-dicarboxylate, diallyl hexane-1,6-dicarboxylate, diallyl heptane-1,7-dicarboxylate, diallyl octane-1,8-dicarboxylate, diallyl nonane-1,9-dicarboxylate, and diallyl decane-1,10-dicarboxylate. In case m is $2n - 2$, i.e. as an unsaturated aliphatic dicarboxylic acid diallyl ester, there may be, for example diallyl ethylene-1,2-dicarboxylate, diallyl propene-2,3-dicarboxylate, diallyl propene-1,2-dicarboxylate, and diallyl propene-1,3-dicarboxylate.

The aromatic dicarboxylic acid diallyl esters of the invention are, for example diallyl phthalate, diallyl terephthalate, diallyl 3-methylphthalate, diallyl 4-methylphthalate, diallyl 5-methylisophthalate and diallyl methylterephthalate.

These diallyl esters can be used alone or in a mixture of two or more thereof.

According to the present method, the diallyl esters can be added in an amount of 2 mole % or less of the total reactants to obtain a copolymer having an optional intrinsic viscosity in a range of about 0.2 to about 3.0. With a small amount of the addition, the product has a higher intrinsic viscosity in comparison with the situation where there is no addition of the diallyl esters. When the addition is over 2 mole %, the polymerization velocity is decreased and a highly cross linked polymer is disadvantageously produced which causes the production of many grits in the emulsion. Accordingly, the most preferable amount of the diallyl esters may be in a range of about 0.01 to about 1 mole %. The present diallyl ester is preferably added at one time before the reaction, but it may be continually added during the reaction.

The relation of the property of the produced copolymer and the amount of the diallyl ester to be added is rather varied in accordance with the kind of the diallyl esters and the polymerization conditions, but it can be readily determined by a preliminary polymerization test. For instance, when vinyl acetate and ethylene are emulsion-copolymerized in the presence of diallyl phthalate, the amount of the diallyl phthalate and the intrinsic viscosity of the produced vinyl acetate-ethylene copolymer have the relation as shown in FIG. 1. Therefore, if an appropriate amount of the diallyl ester is used, the desired copolymer having an intrinsic viscosity of about 0.2 to about 3.0 can be freely produced.

The example of the copolymerizable compound of the invention may be maleic anhydride, glycidyl methacrylate, acrylic acid, diacetoneacrylamide, N-methylolacrylamide, and the like.

The catalyst used in the present invention may be a conventional redox catalyst, for example a water soluble radical initiator (e.g. hydrogen peroxide, potassium persulfate, or ammonium persulfate) is used alone or together with a reducing agent (e.g. l-ascorbic acid, rongalite or ferrous sulfate). The emulsifier used in the present invention may be any one of those used for conventional emulsion-polymerization of vinyl acetate and ethylene. For example, there may be used a nonionic surfactant (e.g. polyoxyethylene nonylphenyl ether or polyoxyethylene sorbitan fatty acid ester) or an anionic surfactant (e.g. sodium laurylsulfonate or sodium dodecylbenzenesulfonate), optionally together with a protective colloid (e.g. hydroxyethyl cellulose or polyvinyl alcohol).

The polymerization temperature may be in the range of conventional temperatures used for the production of vinyl acetate-ethylene copolymer emulsion, i.e. in a range of 30° to 80°C, and the ethylene pressure may be in a range of 0 to 100 atm.

According to the present invention, the desired vinyl acetate-ethylene copolymer having an optional intrinsic viscosity can be produced without changing the reaction conditions, and therefore the present method is greatly valuable for the industrial production of vinyl acetate-ethylene copolymer.

The present invention is illustrated by the following Examples but is not limited thereto.

EXAMPLES 1 TO 7

In a 1 liter stainless steel autoclave with a magnetic stirrer were charged vinyl acetate (100 parts by weight), water (100 parts by weight), an emulsifier (5 parts by weight), ammonium persulfate (0.2 part by weight) and diallyl ethane-1,2-dicarboxylate in an amount as shown in Table 1. After air in the autoclave was purged with nitrogen, the autoclave was heated at 60°C and then the polymerization reaction was carried out for 10 hours while maintaining the ethylene pressure at 60 atm. The produced emulsion was a good one having a lesser amount of grits.

After purging the unreacted ethylene, the produced emulsion was flowed on a glass plate to form a film. The film was dried at ordinary temperature and thereafter dried under a reduced pressure. The product thus obtained had the intrinsic viscosity as shown in Table 1.

Table 1

| Test No. | Amount of diallyl ethane-1,2-dicarboxylate (mole %) | Intrinsic viscosity (dl/g) |
| --- | --- | --- |
| Control | — | 1.50 |
| Example 1 | 0.01 | 2.60 |
| Example 2 | 0.02 | 2.40 |
| Example 3 | 0.03 | 1.50 |
| Example 4 | 0.05 | 1.20 |
| Example 5 | 0.10 | 0.43 |
| Example 6 | 0.15 | 0.41 |
| Example 7 | 0.20 | 0.39 |

EXAMPLES 8 TO 14

In the same manner as described in Examples 1 to 7, the polymerization reaction was carried out at 60°C for 10 hours, excepting that diallyl propene-1,3-dicarboxylate in an amount shown in Table 2 was added instead of diallyl ethane-1,2-dicarboxylate. The copolymer thus obtained had the intrinsic viscosity as shown in Table 2. Any material insoluble in benzene was not observed in any of the products.

Table 2

| Test No. | Amount of diallyl propene-1,3-dicarboxylate (mole %) | Intrinsic viscosity (dl/g) |
| --- | --- | --- |
| Control | — | 1.50 |
| Example 8 | 0.01 | 2.00 |
| Example 9 | 0.02 | 3.00 |
| Example 10 | 0.03 | 2.50 |
| Example 11 | 0.05 | 1.50 |
| Example 12 | 0.10 | 0.70 |
| Example 13 | 0.15 | 0.50 |
| Example 14 | 0.20 | 0.40 |

EXAMPLES 15 TO 24

In the same manner as described in Examples 1 to 7, the polymerization reaction was carried out at 60°C for 10 hours, excepting that diallyl phthalate in an amount shown in Table 3 was added instead of diallyl ethane-1,2-dicarboxylate. The copolymer thus obtained had the intrinsic viscosity as shown in Table 3. Any material insoluble in benzene was not observed in any of the products.

Table 3

| Test No. | Amount of diallyl phthalate (mole %) | Intrinsic viscosity (dl/g) |
| --- | --- | --- |
| Control | — | 1.50 |
| Example 15 | 0.01 | 2.50 |
| Example 16 | 0.02 | 2.24 |
| Example 17 | 0.03 | 1.50 |
| Example 18 | 0.05 | 1.30 |
| Example 19 | 0.10 | 0.45 |
| Example 20 | 0.15 | 0.40 |
| Example 21 | 0.20 | 0.38 |
| Example 22 | 0.30 | 0.38 |
| Example 23 | 0.40 | 0.34 |
| Example 24 | 0.50 | 0.30 |

The relation between the amount of diallyl phthalate and the intrinsic viscosity of the produced copolymer is shown in graphical form in the FIGURE.

EXAMPLES 25 TO 31

In the same manner as described in Examples 1 to 7, the polymerization reaction was carried out at 60°C for 10 hours, excepting that diallyl terephthalate in an amount shown in Table 4 was added instead of diallyl ethane-1,2-dicarboxylate. The product thus obtained had the intrinsic viscosity as shown in Table 4. Any material insoluble in benzene was not observed in any of the products.

Table 4

| Test No. | Amount of diallyl terephthalate (mole %) | Intrinisic viscosity (dl/g) |
|---|---|---|
| Control | — | 1.50 |
| Example 25 | 0.01 | 2.65 |
| Example 26 | 0.02 | 2.30 |
| Example 27 | 0.03 | 1.45 |
| Example 28 | 0.05 | 1.20 |
| Example 29 | 0.10 | 0.43 |
| Example 30 | 0.15 | 0.38 |
| Example 31 | 0.20 | 0.37 |

What is claimed is:

1. A method for producing a vinyl acetate-ethylene-dicarboxylic acid diallyl ester copolymer having an intrinsic viscosity of about 0.2 to about 3.0 at 30°C. in benzene which comprises emulsion-polymerizing a monomeric mixture consisting essentially of vinyl acetate, ethylene and a dicarboxylic acid diallyl ester in water with an emulsifier in the presence of a water-soluble radical initiator at a temperature of 30° to 80°C. under an ethylene pressure of 0 to 100 atm, said dicarboxylic acid diallyl ester being employed in an amount of 0.01 to 2 mole % based on the total amount of reactants and being an aliphatic dicarboxylic acid diallyl ester of the formula:

$$H_2C=HC-H_2COOCC_nH_mCOOCH_2-CH=CH_2$$

wherein $n$ represents an integer of 2 to 10 and $m$ represents $2n$ or $2n-2$, an aromatic dicarboxylic acid diallyl ester or a mixture thereof, the average degree of polymerization of the resulting copolymer being controlled by the use of said diallyl ester in the polymerizing mixture.

2. The method according to claim 1, wherein the aliphatic dicarboxylic acid diallyl ester is at least one member selected from the group consisting of diallyl ethane-1,2-dicarboxylate, diallyl propane-1,3-dicarboxylate, diallyl butane-1,4-dicarboxylate, diallyl pentane-1,5-dicarboxylate, diallyl hexane-1,6-dicarboxylate, diallyl heptane-1,7-dicarboxylate, diallyl octane-1,8-dicarboxylate, diallyl nonane-1,9-dicarboxylate, diallyl decane-1,10-dicarboxylate, diallyl ethylene-1,2-dicarboxylate, diallyl propene-2,3-dicarboxylate, diallyl propene-1,2-dicarboxylate, and diallyl propene-1,3-dicarboxylate.

3. The method according to claim 1, wherein the aromatic dicarboxylic acid diallyl ester is at least one member selected from the group consisting of diallyl phthalate, diallyl terephthalate, diallyl 3-methylphthalate, diallyl 4-methylphthalate, diallyl 5-methylisophthalate and diallyl methylterephthalate.

4. The method according to claim 1, wherein the aliphatic dicarboxylate acid diallyl ester and/or the aromatic dicarboxylic acid diallyl ester are added in an amount of about 0.01 to about 1 mole % of the total amount of reactants.

5. The method according to claim 1, wherein the water-soluble radical initiator is a member selected from the group consisting of hydrogen peroxide, potassium persulfate and ammonium persulfate.

6. The method according to claim 1, wherein the emulsifier is a member selected from the group consisting of polyoxyethylene nonylphenyl ether, polyoxyethylene sorbitan fatty acid ester, sodium lauryl sulfonate and sodium dodecylbenzene sulfonate.

7. The method according to claim 1, wherein the aromatic dicarboxylic acid diallyl ester is a diallyl ester of a phthalic, terephthalic or isophthalic acid.

* * * * *